Figures 1, 2:
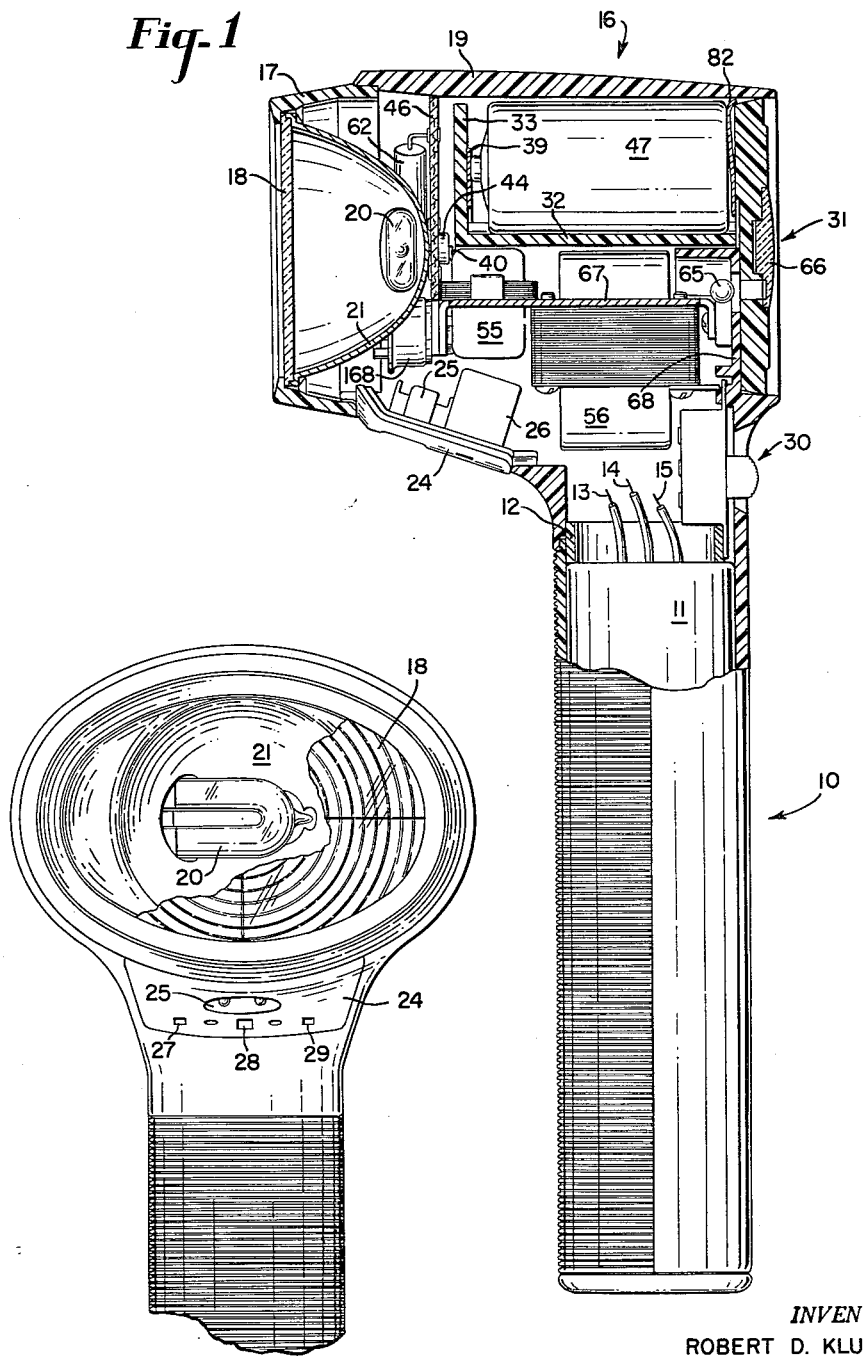

Aug. 14, 1962 — R. D. KLUGE — 3,049,611
PHOTOGRAPHIC FLASH UNIT
Filed Aug. 22, 1960 — 3 Sheets-Sheet 1

INVENTOR.
ROBERT D. KLUGE
BY
ATTORNEY

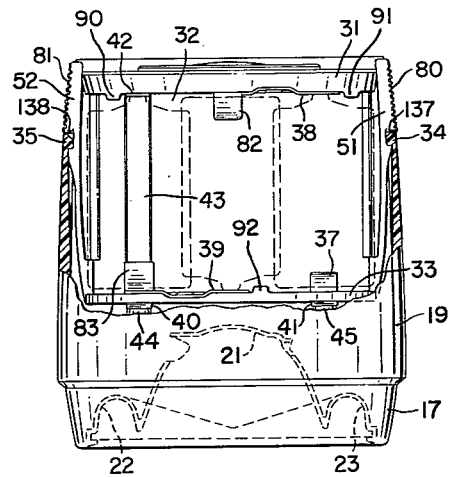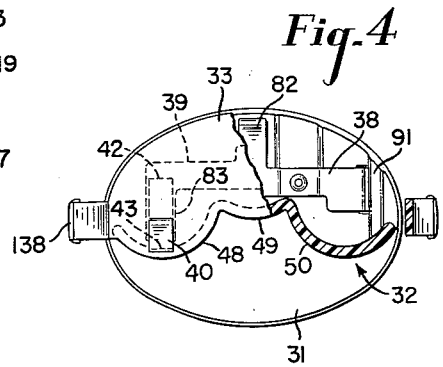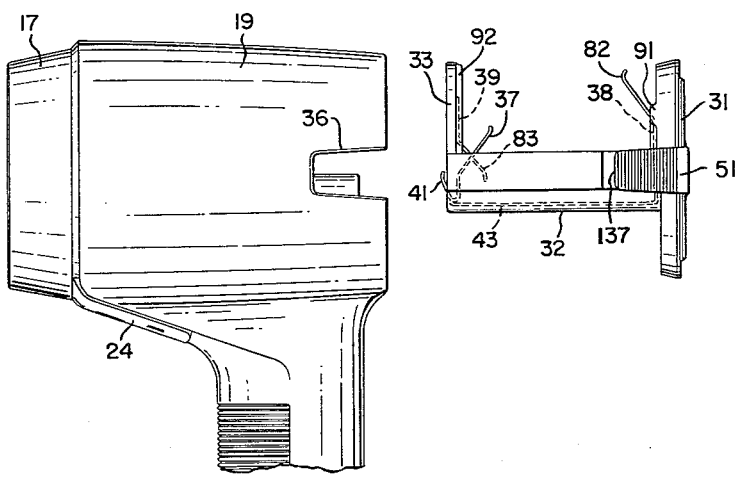

Aug. 14, 1962   R. D. KLUGE   3,049,611
PHOTOGRAPHIC FLASH UNIT
Filed Aug. 22, 1960   3 Sheets-Sheet 3

INVENTOR.
ROBERT D. KLUGE
BY
Francis A. Sirr
ATTORNEY

United States Patent Office 3,049,611
Patented Aug. 14, 1962

3,049,611
PHOTOGRAPHIC FLASH UNIT
Robert D. Kluge, Westminster, Colo., assignor to Minneapolis-Honeywell Regulator Company, Minneapolis, Minn., a corporation of Delaware
Filed Aug. 22, 1960, Ser. No. 51,060
9 Claims. (Cl. 240—1.3)

This invention is concerned with an improved photographic flash unit and particularly with an improved single unit type electronic flash unit which receives its operating voltage from low voltage battery means.

An electronic photographic flash unit may be characterized as the type of flash unit in which the source of illumination consists of a gas filled tube which is connected to receive operating voltage from a high voltage electrolytic capacitor. Triggering means are provided, including a starting electrode for the flash tube, and this triggering means is effective to render the flash tube conductive to allow the capacitor to discharge through the flash tube, between the main current conducting electrodes of this flash tube, to provide a very short duration and brilliant burst of light energy which may be utilized to illuminate a subject to be photographed. The triggering means is arranged to be placed under the control of the camera which is to be used to photograph the scene which is illuminated by the flash unit. Normally, the electronic flash unit is connected to the camera by means of a shutter cord and the internal camera shutter switch functions to synchronize the opening of the camera shutter with the flashing of the electronic flash unit.

Electronic flash units have found wide acceptance in the photographic art due to their excellent light temperature qualities and the relatively low cost per flash which is obtained from this type of unit. For the majority of the photographers, the most desirable electronic flash unit is the type which utilizes low voltage batteries as a primary source of energy. These batteries may be the conventional C or D size tubular 1½ volt batteries. Preferably these batteries should be the C or D size batteries which have been especially constructed by the manufacturer for use in photographic equipment.

An electronic flash unit of this general type has been constructed such that the entire electronic flash unit is placed in a single physical unit. The present invention relates to an improved single unit device of this type in which the construction, and particularly the manner in which the low voltage battery means is constructed and arranged provides a very compact and light weight electronic flash unit, without sacrificing the important considerations of adequate light pattern and efficiency of performance.

Specifically, the present invention is directed to a single unit electronic photographic flash apparatus which may be conveniently mounted at the camera or hand held by the photographer, it being unnecessary for the photographer to hold a separate component or source of operating voltage for the unit. In the apparatus of the present invention, the improved construction includes a removable battery tray which has an integral portion thereof constituting a removable wall of the housing of the flash unit and which carries on the inner surface of the wall a battery tray, such that the wall and battery tray may be readily removed for convenient replacement of the batteries.

Specifically, the present invention provides an electronic flash unit having a handle including an electrolytic capacitor and having a head unit housing mounted at the top of the handle, the housing including a removable wall portion which, when removed, also removes a battery tray, the battery tray physically and electrically holding and connecting the batteries to battery tray terminal means, which terminal means are adapted to be connected to stationary terminals within the flash unit housing when the battery tray is replaced in the housing, the battery tray then serving to also close the housing.

The specific features of the present invention will be apparent to those skilled in the art upon reference to the following specification, claims, and drawings, of which:

FIGURE 1 is a side view of the improved photographic flash unit, portions of the apparatus being broken away to show various internal components, some of which are shown in section, FIGURE 2 is a front view of the photographic flash unit, showing the flash tube within the reflector, the Fresnel type lens, the lens being partially broken away, and showing the various outlet connectors which are located on the underside of the head unit housing, FIGURE 3 is a top view of the flash unit, the rear portion of the head unit housing being broken away to show a top view of the battery tray with the tubular low voltage batteries shown in phantom, and specifically showing the manner in which this battery tray locks into position and is firmly held to the head unit housing.

Figure 6:
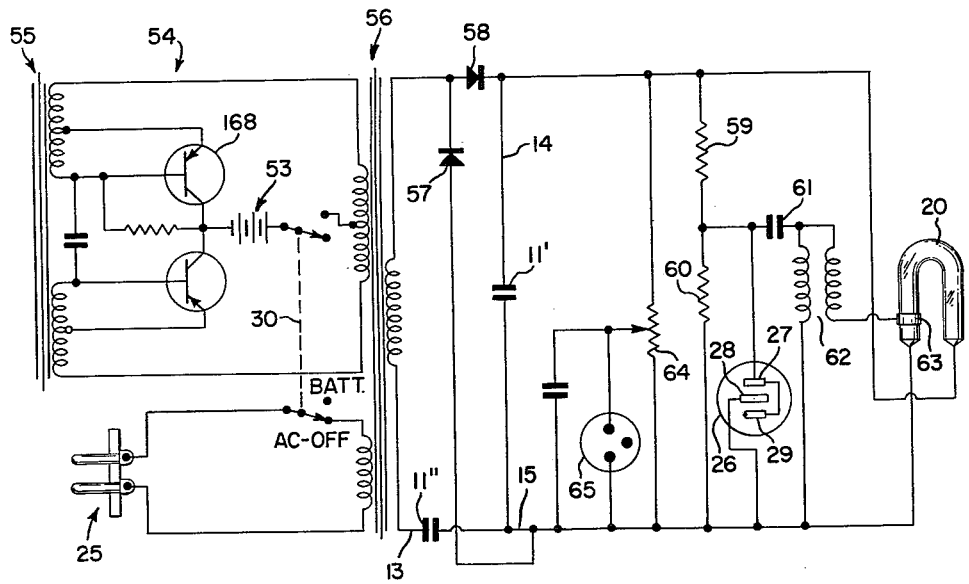

FIGURE 4 is an end view of the battery tray, showing the internal wall thereof partially broken away, FIGURE 5 is a side view of the head unit housing with the battery tray arranged for insertion into the housing, and FIGURE 6 is a schematic diagram of the electrical circuitry contained within the photographic flash unit.

Referring now to FIGURE 1, reference numeral 10 designates generally the tubular handle member, which is circular in cross section. This handle member may be formed in any manner, for example of a plastic insulating material, and preferably has an open top portion to allow a tubular, high voltage electrolytic capacitor means 11 to be placed in position in the handle unit. This electrolytic capacitor means is held within the handle member by means of a locking or positioning ring 12 which is also mechanically associated with a manually operable switch 30. For purposes of simplicity, the exact details of the electrical circuitry to which the electrolytic capacitor means 11 is connected is not shown. Three lead wires 13, 14 and 15 are partially shown. Capacitor means 11 consists of two capacitors which are identified as capacitors 11' and 11" on the schematic diagram of FIGURE 6. In this schematic diagram the lead wires 13, 14 and 15 are also identified. The placing of capacitor means 11 within tubular handle member 10 allows the use of a standard shape capacitor, allows convenient replacement in case of a capacitor failure, and provides more even weight distribution of the flash unit.

Referring again to FIGURE 1, reference numeral 16 designates generally a head unit housing, also formed of an electrically insulating material, for example a plastic. The front portion of this head unit housing includes an open-end annular ring 17 which mounts a Fresnel type lens 18. Ring 17 is attached to the main portion 19 of the housing 16 by any conventional means; the specific means is not shown.

In FIGURE 2, the lens 18 is shown as partially broken away to show the electronic flash tube 20 disposed within its reflector 21. FIGURE 3 likewise shows reflector 20, and in this case the reflector is shown from a top view so that cavities 22 and 23 formed therein can be readily seen. The flash tube 20 however cooperates with the central main portion of the reflector.

Head unit housing 16 includes a terminal block or outlet connector plate 24 which is provided with a first connector means 25 and a second connector means 26. This plate 24 is shown in a side view in FIGURE 1, and in a front view in FIGURE 2. In FIGURE 2, the connector 25 is seen to consist of a single recess, while terminal block 26 consists of polarized socket means 27, 28 and 29. As can be seen schematically in FIGURE 6, outlet 25 consists of a pair of springs which are mounted within the recess shown in FIGURE 2. Connector 26 can be seen to be a double polarized outlet connector having a common slot 28 and a pair of mating slots 27 and 29. Such a construction for connector 26 is provided to facilitate the use of the conventional right angle shutter cord and to allow the cord to extend away from the flash unit from either side, as the photographer may select.

Reference numeral 30 identifies a switch which is located on the back surface of handle member 10 and at the top thereof to allow convenient control of the switch as the photographer holds the flash unit by means of the handle member. The electrical function of this switch can be seen in FIGURE 6 wherein the switch is shown as a double pole switch having two positions, identified as "batt" and "A.C.-off." The functioning of this switch in its two positions will be later described.

The rear portion of the head unit housing 16 consists of a removable exterior wall designated generally by means of the reference numeral 31. This removable wall is formed integral with an interior projecting battery receiving tray 32 carrying a second interior wall member 33 at the interior end thereof. This battery receiving tray can be seen in three different views in FIGURES 3, 4 and 5. FIGURE 3 shows the top view of this battery tray and from this view the manner in which the tray locks into position in the housing member 19 can be seen. Housing member 19 is provided with a pair of lugs 34 and 35 which are formed on the interior surface of oppositely disposed finger slots, one of the slots being identified by the reference numeral 36 in FIGURE 5. The lugs 34 and 35 mate with grooves 137 and 138 which are formed in resilient spring-like members having finger actuator portions 80 and 81 which mate with the finger slots in the housing and which, when manually depressed disengage the grooves from the lugs and allow the battery tray to be removed.

Preferably, the battery tray is formed of a plastic insulating material and the resilient latching means, including notches 137 and 138 and the flexible arm members 51 and 52, are formed integral therewith and are thin enough to be resilient to allow the arms to be depressed inwardly from the position shown in FIGURE 3 to release the latching means 34—137 and 35—138.

In FIGURE 3, the low voltage batteries are shown in phantom. The electrical circuitry of the tray itself is such that a spring contact member 37 engages the base of one battery while a flat contact member 38 engages the cap terminal of this battery. Flat contact member 38 is formed integral with a further spring contact member 82 to engage the base of a second battery, while a flat contact member 39 engages the cap of this second battery. Flat contact member 39 is likewise formed integral with a spring contact member 83 to engage the base of the third battery. A flat contact member 42 engages the cap terminal of the third battery.

The three above mentioned batteries, designated by reference numeral 53 in FIGURE 6, are utilized as a source of operating voltage for a transistor type oscillator 54. In order to prevent accidental damage to the transistor circuit due to reversal of battery polarity, three raised ribs 90, 91 and 92 (see FIGURES 3, 4 and 5) are provided on the interior surfaces of walls 31 and 33 of the battery tray. Each of these ribs cooperates with one of the battery receiving concave surfaces 48, 49 and 50 and the ribs function to prevent electrical contact if the batteries are inadvertently placed in the battery tray in reverse position from that shown in phantom in FIGURE 3. For example, should the right hand battery of FIGURE 3 be reversed, rib 91 engages the base of this battery to space the base from flat contact member 38.

Reference numerals 40 and 41 of FIGURE 3 identify output voltage terminals of the battery tray which are disposed on the exterior surface of wall 33. Terminal 40 connects to flat contact member 42 located at the opposite end of the tray. Referring to FIGURE 5, a contact strip 43 lying at the exterior bottom of the battery tray connects members 40 and 42. Terminal 41 is an extension of spring contact member 37. As is now apparent, such a contact arrangement electrically connects the three batteries in series adding relationship to apply an output voltage to terminals 40 and 41.

In FIGURE 4, the interior back wall 33 of the battery tray is shown partially broken away to show flat contact member 38. Output terminal 40 is also shown.

Terminals 40 and 41 connect to mating stationary terminal means 44 and 45, as seen in FIGURE 3. These mating terminal means 44 and 45 are mounted on an insulating mounting card or board 46, shown in section in FIGURE 1. FIGURE 1 shows battery tray terminal 40 in engagement with stationary terminal 44, the terminals 41 and 45 being cut away in the showing of FIGURE 1. FIGURE 1 also shows a low voltage tubular battery, for example a C-cell, 47 in position in the battery tray. The battery tray of FIGURE 1 is shown in section substantially through the center thereof and therefore battery 47 is the middle battery of the further view of FIGURE 3, which battery engages spring contact member 82 and flat contact member 39, as shown.

In order to provide a small compact flash unit, having good weight distribution, the battery tray has been formed of three concave surfaces, as shown in FIGURE 4. These three surfaces are identified by the reference numerals 48, 49 and 50 respectively. The surfaces 48, 49 and 50 are staggered in elevation in a unique fashion to provide a maximum of space efficiency and weight distribution within the housing member.

The electrical circuitry of the electronic flash unit is shown in FIGURE 6. The three low voltage batteries contained in the unique battery tray are represented by the battery 53. The electrical circuit including these batteries is under the control of switch 30 and when this switch is placed in the "batt" position transistor type oscillator 54 is energized, this oscillator having a first transformer 55 and a second output transformer 56. Transformer 56 is connected to a voltage doubler network including rectifiers 57 and 58 to charge capacitors 11′ and 11″. Capacitor 11′ is directly connected to the main current conducting electrodes of flash tube 20. The charge on capacitor 11′ is also distributed to a voltage dividing network including resistors 59 and 60. In this manner, a triggering capacitor 61 is charged and through the medium of a trigger transformer 62, the control electrode 63 of flash tube 20 is adapted to be energized. As is well known, capacitor 61 is arranged to be discharged through the primary of transformer 62 through the medium of a camera shutter switch which is to be connected to the electronic flash unit by means of a cord placed in mating relationship with outlet connecter 26.

The voltage on capacitor 11′ is also distributed to a potentiometer 64 whose tap is connected to energize a neon indicator light 65. This indicator light can be seen in FIGURE 1 and the energization of this light may be viewed by the photographer through a button 66 carried by the back wall 31 of the battery tray, to thereby indicate to the photographer that the electronic flash unit is in an operating condition, ready to illuminate a scene to be photographed.

In FIGURE 1, the mechanical positioning of a number of the electrical components of FIGURE 6 can be seen. Transformers 55 and 56 are physically mounted on a chassis member 67 which is attached to a riser portion 68 of the housing member. Also, mounting board 46 is mounted in the left-hand end of chassis member 67. One of the two transistors, identified by the reference number 168 can also be seen in FIGURE 1. Both of the transistors of FIGURE 6 are mounted on the board 46, one of them being cut away in FIGURE 1. Reference numeral 62 of FIGURE 1 shows the physical disposition of the trigger transformer 62 of FIGURE 6. The complete physical layout of the components, such as the various resistors and the various lead wires, are not shown in FIGURE 1 since such a showing would unduly complicate the disclosure of the mechanical construction of FIGURE 1 and the disclosure of the manner in which the battery tray cooperates with the terminal means 44 mounted on the board member 46.

From FIGURE 1, it can be seen that chassis 67 which is mounted substantially parallel to the battery receiving portion of the tray, and mounting board 46 which is mounted thereon substantially parallel to the interior end wall of the battery tray, provide a unique means of physically mounting the components of the circuit of FIGURE 6, and this is done in a manner to define a battery tray receiving component to receive the unique battery tray. Such a construction provides a very compact electronic flash unit which is small size, light weight and yet has good efficiency and a good light emissive pattern.

From the above description it can be seen that I have provided an improved electronic flash unit and particularly an improved electronic flash unit of a unitized construction in which a single unit houses the complete electronic flash unit and in which a removable battery tray which constitutes a portion of the exterior housing of the flash unit can be removed to facilitate easy and convenient replacement of the low voltage batteries. This battery tray is constructed in a manner to provide an optimum arrangement of the batteries to conserve space without sacrificing the operating efficiency of the electronic flash unit.

Other modifications of the present invention will be apparent to those skilled in the art and it is therefore intended that the scope of the present invention be limited solely by the scope of the appended claims.

I claim as my invention:

1. A single unit electronic photographic flash apparatus of the type using low voltage batteries, comprising; a hollow tubular handle open at the upper end thereof, a tubular high voltage capacitor mounted within said handle, a tubular open end head unit housing mounted on said upper end of said handle such that the axis of said housing is substantially perpendicular to the axis of said handle, a reflector, a high voltage flash tube mounted within said reflector, means mounting said reflector and flash tube within said housing at the forward end thereof to close the forward end of said housing, mounting chassis means mounted within said housing to divide the interior of said housing into a first compartment and a battery compartment, low voltage to high voltage converting means, means mounting said voltage converting means on said chassis means within said head unit housing, a removable wall member removably mounted to close the back end of said housing, a battery tray mounted on the interior side of said wall member and adapted to receive a plurality of low voltage batteries within said battery compartment, said wall member being selectively removable to facilitate replacement of the batteries, and electrical circuit means interconnecting said flash tube, said capacitor, and said voltage converting means with the batteries so that the low battery voltage is converted to a high voltage to charge said capacitor for selective discharge through said flash tube to produce a flash of light for photographic purposes.

2. A single unit electronic photographic flash device, comprising; a tubular handle member, a high voltage electrolytic capacitor in said handle member, an open end head unit housing mounted on said handle member with the axis of said housing disposed at substantially a right angle to said handle member, a reflector, a gas filled flash tube mounted within said reflector, means mounting said reflector and flash tube within said housing to close one open end thereof, a removable end wall for said housing removably mounted to close the other open end of said housing, a chassis member mounted within said housing substantially parallel to said axis with one end located in the vicinity of said reflector, a mounting card fixed to said one end of said chassis member and extending substantially perpendicular to said axis, a pair of voltage input terminals mounted to extend on the side of said mounting card opposite said reflector, voltage transforming means mounted on said chassis member and said mounting card; circuit means connecting said capacitor to said flash tube, circuit means connecting said input terminals to said transforming means and said transforming means to said capacitor; a battery holding tray mounted on the interior surface of said removable end wall and positioned to extend substantially parallel to said chassis member, an interior end wall for said battery tray mounted thereon opposite said removable end wall, and a pair of voltage output terminals mounted on said interior end wall engaging said input terminals when said removable wall is placed in position at said other open end of said housing.

3. In a photographic flash unit of the type having a tubular handle member and a hollow head unit housing which is open at both ends and mounted at one end of the handle member, a reflector, a photographic flash tube mounted within said reflector, means mounting said reflector and flash tube within one open end of said head unit housing to close the same, a pair of voltage supply terminals mounted at a fixed position within said head unit housing, electrical means connecting said terminals to said flash tube, a removable exterior wall of said head unit housing forming a portion of the exterior surface thereof to close the other open end, a battery receiving tray fixed to the interior surface of said removable wall and removable therewith, said tray being adapted to receive battery means to function as the voltage supply for the flash unit, and electrical connecting means carried by said tray adapted to connect the battery means to said voltage supply terminals.

4. In a photographic flash unit of the type having a tubular handle member and a hollow head unit housing having a first and a second open portion, means mounting said housing at one end of the handle member, a reflector, a photographic flash tube mounted within said reflector, means mounting said flash tube and reflector within the first open portion of said head unit housing to close the same, a pair of voltage supply terminals mounted at a fixed position within said head unit housing, electrical means connecting said terminals to said flash tube, a removable wall of said head unit housing forming a portion of the exterior surface of said head unit housing to close the second open portion thereof, and a battery receiving tray fixed to the interior surface of said removable wall and removable therewith, said tray being adapted to receive a plurality of low voltage batteries to function as the voltage supply for the flash unit, said tray having electrical connecting means to receive and make electrical connection to each individual low voltage battery to connect the same in a series circuit to thus add the voltages of the batteries and to connect the batteries to said voltage supply terminals.

5. A high voltage electronic photographic flash unit comprising; a tubular handle member housing a high voltage capacitor, said handle member being adapted to be held by the hand of a photographer, a hollow housing mounted at the top end of said handle member, said housing having a first and a second opening in the exterior wall thereof, a reflector, a high voltage gas filled flash tube mounted within said reflector, means mounting said reflector and flash tube within and closing the first opening in said housing, a wall member mounted within said housing to define a first compartment between said reflector and one side of said wall member and to define a second battery compartment on the other side of said wall member, a pair of voltage supply terminals mounted on said other side of said wall member; voltage transforming means mounted within said housing and electrically interconnected with said capacitor, said flash tube and said voltage supply terminals to form a means to charge said capacitor for subsequent discharge through said flash tube to produce a flash of light; a removable cover communicating with said battery compartment and closing said second opening in said housing, a battery tray fixed to the interior side of said removable cover, battery tray terminals mounted on said battery tray and electrically engaging said voltage supply terminals, said tray being constructed and arranged to hold a plurality of low voltage batteries within said battery compartment with the batteries in engagement with said battery tray terminals to thereby supply operating voltage for said voltage transforming means.

6. In a photographic flash unit of the type having a hollow head unit housing, open at a first and a second portion thereof, a reflector, a photographic flash tube mounted within said reflector, means mounting said reflector and flash tube within said one portion of said head unit housing to close the same, a pair of voltage supply terminals mounted at a fixed position within said head unit housing electrical means interconnecting said supply terminals and said flash tube, a removable wall for said head unit housing, said removable wall forming a portion of the exterior surface of said head unit housing to close said second portion thereof, a battery receiving tray fixed to the interior surface of said removable wall and removable therewith, said tray being adapted to receive battery means to function as the voltage supply for the flash unit, and output terminals in said battery tray electrically connecting to the battery means and to said supply terminals.

7. In combination with a single unit electronic photographic flash apparatus having an external housing with an opening therein, a removable exterior wall portion of said housing mounted to close said opening, a battery tray mounted on the inside surface of said exterior wall substantially perpendicular to said exterior wall and adapted to receive battery means, which battery means functions as a source of supply voltage for the photographic flash apparatus, an end wall formed at the end of said tray opposite said exterior wall, a first metallic spring clip terminal mounted on said end wall and having a first portion communicating with said battery tray and a second portion extending beyond said end wall on the side opposite from said battery tray, and a second metallic spring clip terminal mounted on the inside surface of said exterior wall, said second terminal having a first portion also communicating with said battery tray and having a second portion extending along said battery tray and beyond said other side of said end wall, said first portions of said first and second terminals being adapted to make electrical connection to battery means in said tray and to resiliently hold the battery means in said tray, and said second portion of said first and second terminals being electrically connected to portions of the electronic flash apparatus when said removable exterior wall portion of said housing is placed in operative association with the electronic flash apparatus to complete a unitary housing.

8. A battery tray for an electronic photographic flash unit comprising; a battery tray member formed of an electrical insulating material having a platform portion provided with a surface constructed and arranged to cradle a tubular low voltage battery of the type having a base and an oppositely disposed extending cap terminal, a pair of end walls formed integral with said platform portion at opposite ends thereof, a pair of metallic terminal means, one being mounted at the interior surface of each of said end walls to extend from said walls to facilitate electrical connection to the battery, one of said terminal means contacting the base and the other contacting the cap terminal, and a raised rib formed on the inside surface of the one of said end walls which includes said other terminal means at a position spaced from said other terminal means, said rib thus being associated with the particular end wall which is intended to receive the cap terminal of the battery, said rib extending from said one end wall a greater distance than said other terminal means extends from said one end wall to thereby enable said rib to engage the battery base and space the base from said other terminal means to prevent electrical contact by said other terminal means to the battery base and to open the circuit in the event that the battery is inadvertently inserted in the battery tray in an incorrect polarity position.

9. In a photographic flash unit of the type having a hollow head unit housing, open at a first and a second portion thereof, a reflector, a photographic flash tube mounted within said reflector, means mounting said reflector and flash tube within said one portion of said head unit housing to close the same, a pair of voltage supply terminals mounted at a fixed position within said head unit housing, electrical means interconnecting said supply terminals and said flash tube, a removable wall for said head unit housing, said removable wall forming a portion of the exterior surface of said head unit housing to close said second portion thereof, a battery receiving tray fixed to the interior surface of said removable wall and removable therewith, said tray being adapted to receive battery means to function as the voltage supply for the flash unit, output terminals in said battery tray electrically connecting to the battery means and to said supply terminal, resilient latching means mounted on said battery tray including a catch member and an actuating release member therefor, and a mating catch member on the inside surface of said head unit housing, said catch member being adapted to engage said mating catch member to thereby mechanically mount said battery tray and said removable wall on said head unit housing, said actuating release member being disposed on the external surface of said head unit housing to facilitate unlatching of said latching means.

References Cited in the file of this patent

UNITED STATES PATENTS

| | | |
|---|---|---|
| 2,624,831 | Farber | Jan. 6, 1953 |
| 2,714,152 | Ackerman et al. | July 26, 1955 |
| 2,740,339 | Carter | Apr. 3, 1956 |
| 2,741,396 | Lobl | Apr. 10, 1956 |
| 2,811,907 | Hyzer | Nov. 5, 1957 |
| 2,824,953 | Rock | Feb. 25, 1958 |
| 2,843,730 | Schwartz | July 15, 1958 |

FOREIGN PATENTS

| | | |
|---|---|---|
| 444,716 | Great Britain | Mar. 26, 1936 |
| 578,974 | Canada | July 7, 1959 |